H. G. WILMERLING.
VALVE.
APPLICATION FILED MAY 9, 1913.
1,119,739.
Patented Dec. 1, 1914.
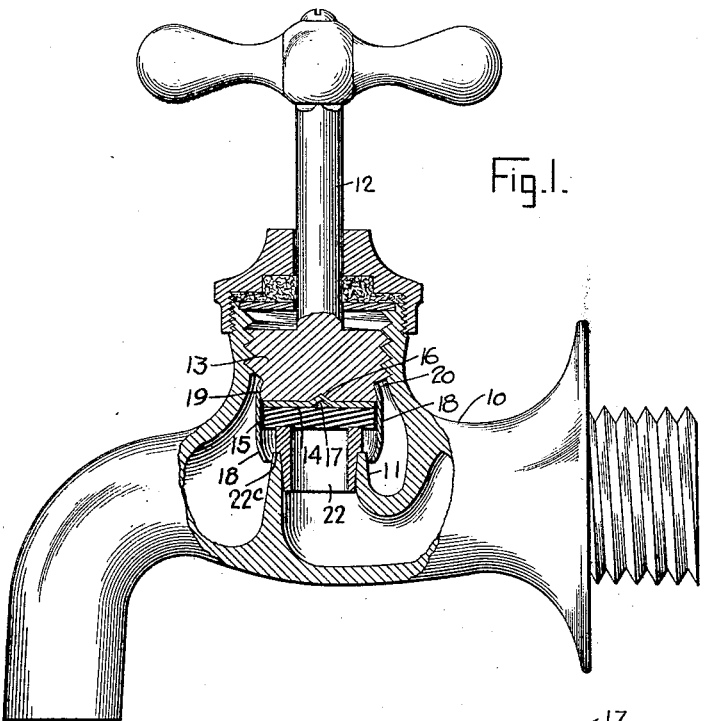
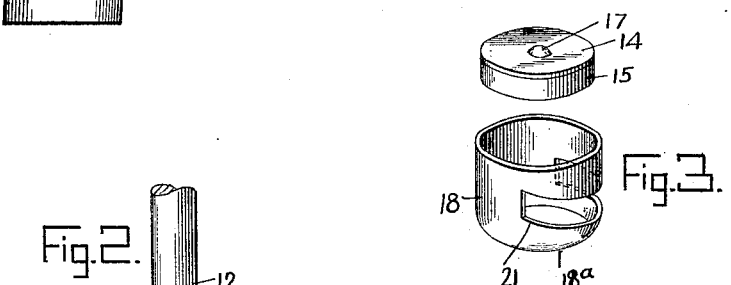
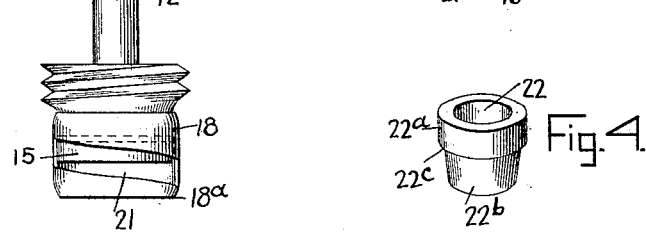
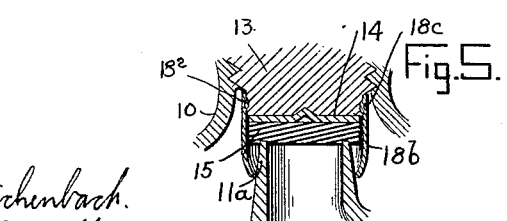
WITNESSES
INVENTOR
Henry G. Wilmerling,
BY
ATTORNEYS

_UNITED STATES PATENT OFFICE._

HENRY G. WILMERLING, OF NEW YORK, N. Y.

VALVE.

1,119,739.	Specification of Letters Patent.	Patented Dec. 1, 1914.

Application filed May 9, 1913. Serial No. 766,601.

*To all whom it may concern:*

Be it known that I, HENRY G. WILMERLING, a citizen of the United States, and a resident of the city of New York, borough of Brooklyn, in the county of Kings and State of New York, have invented a new and Improved Valve, of which the following is a full, clear, and exact description.

My invention relates more particularly to the valve and valve seats of cocks or faucets.

It is a design of my invention to overcome objections to the ordinary valve and seat. Thus ordinarily, a washer is employed on the valve stem to come to a bearing on the seat, a screw being usually employed to secure the washer in place. Frequently the screw becomes corroded and there is difficulty in removing the washer to renew the same.

My invention provides a means for retaining the washer and permitting its revolution relatively to the valve stem, the parts being so arranged that the washer may be very readily removed when desired, but will be held properly in place against accidental displacement during use. Also with faucets, the valve seat becomes worn to an extent to be almost useless, requiring the faucet to be discarded.

My invention provides an auxiliary seat which is particularly adapted to my improved washer and its retaining means; the auxiliary seat is of a character to be inserted in the valve above the ordinary seat and without change in the latter.

The distinguishing features of my invention, and the important structural elements characterizing the preferred embodiment which is illustrated as an example, will be more particularly explained in the specific description hereinafter to be given.

Reference is to be had to the accompanying drawings forming a part of this specification, in which similar characters of reference indicate corresponding parts in all the views.

Figure 1 is a side elevation with parts in section, showing a faucet embodying my invention; Fig. 2 is a fragmentary side elevation of the lower end of the valve stem; Fig. 3 is a perspective view of the washer, the disk that constitutes the backing for the washer and may rotate with the latter, and a ferrule to retain said parts; Fig. 4 is a perspective view of the auxiliary valve seat; and Fig. 5 is a detail vertical section illustrating a modification.

In the form shown in Figs. 1 to 4, a faucet 10 of common form is shown, having a valve seat 11, and a handled valve stem 12, movable to move the valve toward and from the valve seat. On the head 13 of the valve 10 is seated a disk 14, which forms the backing for a washer 15, which may be of leather or other suitable material as is usual in devices of this kind. The head 13 is formed at the surface presented toward the valve seat 11, with a central depression 16, preferably conical, and a corresponding projection 17 is produced on the back of the disk 14, to be received in the depression 16 and constitute a center of rotation for the said disk and a center of limited rocking movement of the disk as the washer engages the seat. The projection 17 may be produced by striking up the material of the disk at the center.

To retain the disk 14 and washer 15 in place at the under side of the valve stem, while permitting the relative rotation of the valve stem, a thimble or ferrule 18 is provided and properly held to the valve stem back of the disk 14. As one means for retaining the thimble 18 in place, I have shown a bead or annular rib 19 on the valve head, thereby producing a contraction at the rear of said bead in which the adjacent end of the thimble is spun or bent, as at 20. The opposite end of the thimble 18 from the valve stem is contracted, as at 18ª, to prevent the escape of the washer 15 and disk 14 when the valve stem is raised. The said thimble projects from the valve stem a distance beyond the washer 15, and is provided at a side thereof with a lateral slot 21 that extends approximately half way through the thimble, thereby presenting an opening through which the disk 14 and washer 15 may be entered laterally into the thimble. As seen best in Fig. 2, the slot 21 is not parallel with the upper and lower ends of the thimble, but is inclined to the axis of the thimble, being in the form of approximately half of a convolution, and its height is such as to permit the washer 15 to be entered laterally when brought parallel with the slot and into alinement therewith, the lesser thickness of the disk 14 permitting said disk to be readily entered into the slot. After the disk and washer have been entered they are brought parallel with the face of the valve stem, in which position, as will be seen from Fig. 2, the washer and disk will have a parallel movement in dropping to the contracted end 18ª. When in position the washer 15 will have a portion thereof at all times overlapping either the portion of the thimble 18 above the slot, or a portion at the opposite side overlapping the said thimble below the slot, and the washer will thus have no tendency to lateral displacement out of the slot. By so projecting the lower contracted end of the thimble beyond the washer as to permit a play of the washer and disk in the direction of the axis of the valve stem, they will not be held for long periods pressed in position against the valve stem, and will be maintained perfectly loose and free to permit the relative rotation of the stem; moreover, the provision of the slot as described as a means for the entrance and removal of the washer, permits of the ready renewal of the washer, as is required in practice to maintain the faucet in perfect condition.

In order to insure that the valve seat is of a character to accommodate the thimble 18, I provide an auxiliary seat 22, made tubular for the passage of the fluid therethrough. The upper portion of the auxiliary valve seat is cylindrical, as at 22ª, while the lower portion 22ᵇ, which is of reduced diameter to enter the faucet within the valve seat 11 and extend below the latter, may be made slightly tapered, to conform to any slight variations in the water passage of the valve seat of particular faucets. The reduced lower portion 22ᵇ and the larger upper portion 22ª result in an overhanging shoulder 22ᶜ, which comes to a bearing on the ordinary valve seat 11, as will be understood from Figs. 1 and 4. The height of the upper portion 22ª of the auxiliary valve seat is such as to insure that the washer will be pressed tightly against the said auxiliary seat and effect a proper closure of the valve, since obviously there will be considerable movement of the valve stem toward the seat, after the contact of the washer with the seat, without a firm closure being effected. An important feature of the auxiliary valve seat as described, is that it makes it possible to preserve the life of the faucet after the ordinary seat has become so worn as to no longer give a proper service, and thus many faucets that are now discarded may be restored to perfect efficiency.

In the form shown in Fig. 5, the faucet A has the valve head 13 as in the other form, as well as the described washer 15 and disk 14. The thimble 18ᵇ in Fig. 5, instead of being permanently crimped onto the valve head, slides frictionally thereon, and in addition also, may have an internal projection 18ᵉ at one or more points around the thimble, there being corresponding depressions formed in the valve head 13, to receive said projections. By this construction the thimble may be readily removed to renew the washer 15. In Fig. 5, also, the integral valve seat 11ª is continued above the normal height and rises sufficiently to be overlapped by the thimble 18ᵇ in the raised position of the thimble, to insure that the washer will be pressed tightly against said seat as described above in connection with the auxiliary seat.

The described construction affords a simple means for carrying my invention into effect, and I would state in conclusion that I do not limit myself strictly to the mechanical details herein illustrated, since manifestly the same can be considerably varied without departure from the spirit of the invention.

Having thus described my invention, I claim as new, and desire to secure by Letters Patent:—

1. A valve having a valve seat, a valve stem, a washer, and a thimble carried by the valve stem and surrounding the washer, the said thimble projecting beyond the washer and having a lateral slot through which the washer may be entered and removed, said slot being inclined to the axis of the valve stem.

2. A valve having a valve seat, a valve stem, a washer, a backing plate at the back of the washer, and a thimble carried by the valve stem and surrounding the washer, the said thimble projecting beyond the washer and having a lateral slot through which the washer and backing plate may be entered and removed, the said slot being inclined to the axis of the valve stem.

3. A valve having a valve seat, a valve stem, a washer at the end of the stem, a backing plate between the washer and stem, said plate and stem having respectively a central projection and a corresponding recess, and a thimble on the stem inclosing the washer and its backing plate and in which the washer and plate have axial movement, the depression serving to center the projection and backing plate in the thimble.

In testimony whereof I have signed my name to this specification in the presence of two subscribing witnesses.

HENRY G. WILMERLING.

Witnesses:
J. L. McAULIFFE,
PHILIP D. ROLLHAUS.

Copies of this patent may be obtained for five cents each, by addressing the "Commissioner of Patents, Washington, D. C."